United States Patent [19]

Tanaka et al.

[11] 4,299,023

[45] Nov. 10, 1981

[54] MACHINE FOR WINDING AND INSERTING COILS

[75] Inventors: Minoru Tanaka, Yokohama; Fumikazu Itoh, Fujisawa; Hiroshi Saitoh, Tokyo; Takashi Kobayashi, Fujisawa; Akiyoshi Sasaki; Norio Akutsu, both of Hitachi, all of Japan

[73] Assignee: Hitachi, Ltd., Tokyo, Japan

[21] Appl. No.: 109,418

[22] Filed: Jan. 3, 1980

[30] Foreign Application Priority Data

Jan. 12, 1979 [JP] Japan .................................. 54-1358

[51] Int. Cl.³ ........................................... H02K 15/06
[52] U.S. Cl. .................................. 29/564.1; 29/596; 29/734; 29/736
[58] Field of Search ....................... 29/734, 736, 564.1, 29/564.6, 596; 140/92.1

[56] References Cited

U.S. PATENT DOCUMENTS 3,557,432  1/1971  Pavesi .................................... 29/736
4,047,293  9/1977  Kieffer ................................... 29/736

Primary Examiner—Carl E. Hall

Attorney, Agent, or Firm—Craig and Antonelli

[57] ABSTRACT

In a machine for winding and inserting coils of the type wherein a flier is rotated so as to wind the conductor drawn from the flier around two blades of an insertion tooling and an auxiliary plate located radially outwardly of said two blades and spaced apart therefrom by a predetermined distance, thereby forming a coil which is directly inserted together with a wedge into slots of a magnetic core of a rotary electric machine, an improvement wherein the blades with wedge guides which form the insertion tooling are divided into alternating main and auxiliary blades equiangularly spaced apart from each other, the auxiliary blades being axially movable relative to said main blades in such a way that when the conductor is wound around a bobbin formed by two of the main blades and an auxiliary plate, the auxiliary blades are retracted away from the main blades, but when the wound coils are inserted into the slots of the magnetic core, the auxiliary blades are raised to align with the main blades, thus forming the insertion tooling. In addition, all the coils for one phase may be continuously wound so as to have only one starting lead and one finishing lead.

4 Claims, 11 Drawing Figures

MACHINE FOR WINDING AND INSERTING COILS

BACKGROUND OF THE INVENTION

The present invention relates to generally a machine for winding coils and inserting the same into the slots of a magnetic core of a rotary electric machine and more particularly a machine for winding coils and inserting the same along with wedges into the slots of a magnetic core of a rotary electric machine.

The assembly of magnetic cores such as stators of rotary electric machines includes a step of inserting into the slots of a stator the coils which have been previously wound and a step of inserting the wedges into the slots.

It has been well known in the art that especially when the coils consisting of many turns of a fine conductor are inserted into the stator core of a motor, it is by far preferable to insert both the coils and wedges simultaneously than separately because better performance or qualities of the coils may be maintained; that is, the disconnection of the coil may be minimized; the degradation of the insulation due to the damage to the conductor may be prevented; and the coils may be securely held in the slots by the wedges.

There has been devised and demonstrated a machine capable of simultaneously inserting all the coils and wedges into a stator core. This machine is provided with a plurality of blades which are extended through a stator core and contact the inside peripheral surface thereof so as to guide the coils towards the slots and a plurality of wedge guides which contact with one of the end faces of the stator core so as to guide the wedges towards the slots. The coils to be inserted are previously wound by a separate winding machine and are inserted between the blades according to a predetermined pattern. Thereafter they are inserted into the slots along with the wedges in the manner described above.

However the coil and wedge inserting machine of the type described above has some defects to be described below. When the edgewise wound coil is removed from the bobbin of the winding machine and inserted into the insertion tooling of the coil insertion machine, the coil is disturbed so that when the coil is inserted into the slots, the conductor of the coil is trapped between the stator core and an inserting means and is cut off and the coil cannot be snugly inserted into the slots and securely held by the wedge, thus resulting in the rejection of the finished product. In addition, manual labor is needed to remove the coil from the bobbin and mount it on the insertion tooling. Furthermore, the productivity is low because the connections between the crossover leads are needed after the insertion.

As disclosed for instance in U.S. Pat. No. 2,934,099, there has been invented and used a machine capable of winding a coil and directly inserting it into the slots of a stator core. With this machine, the coils for respective poles are formed individually around bobbins. As a result, the simultaneous insertion of the coils and wedges is impossible. In addition, after the coils and wedges are inserted, the connection between the crossover leads is needed. Furthermore the winding step and the insertion step must be alternately carried out for respective poles. Thus, this machine has a low productivity and a low rate of operation.

As disclosed for instance in U.S. Pat. No. 3,817,295, there has been also invented and used a machine wherein there is provided an inserter tooling consisting of a plurality of blades with different heights and supporting means disposed radially outwardly of the inserter tooling; and a coil is wound around a bobbin formed by two of the blades and one of the supporting means, the wound coil being directly inserted into the slots of a stator core.

The last mentioned machine of the type described above has also a low productivity or a low efficiency because of the following reasons. Firstly, each time a coil for one pole is formed, it must be immediately inserted into the stator. As a result, many insertion steps are needed. In addition, the connection between the crossover leads is still needed. Furthermore since the blades are not uniform in height, the wound coils are increased in length.

SUMMARY OF THE INVENTION

The present invention was made to overcome substantially the above and other problems encountered in the prior art machines for winding the coils and inserting them into the slots of a stator core or the like and has for its primary object the providing of a machine for winding and inserting coils which is capable of forming all the coils for one phase without disconnecting them between the poles and of inserting all the coils and wedges simultaneously into the slots of a stator core or the like.

According to one aspect of the present invention, the blades, which constitute an inserter or insertion tooling, are divided into alternating main and auxiliary blades which are equiangularly spaced apart form each other. The auxiliary blades are so arranged so as to be axially movable relative to the main blades. A plurality of auxiliary plates are disposed radially outwardly of the insertion tooling and spaced apart therefrom by a suitable distance. When the coil is formed around a bobbin which is formed by two of the main blades and one of the auxiliary plates, the auxiliary blades are retracted away from the main blades or from the path of a flier. The flier is so rotated and a coil winding head which carries the insertion tooling is so indexed that all the coils for one phase are wound continuously without disconnecting them between the poles. When all the coils to be inserted into the slots of a stator core or the like are completed in the manner described above, the auxiliary blades are advanced to align with the main blades, thus forming the insertion tooling. The insertion tooling pushes the coils along with the wedges supplied from a wedge supply means into the slots of the stator core or the like. Thus both the coils and wedges may be inserted by a single insertion step. In addition, the need for interconnecting the crossover leads between the coils for respective poles may be eliminated. As a consequence, the present invention may considerably improve the productivity.

The above and other objects, features, effects and advantages of the present invention will become more apparent from the following description of one preferred embodiment thereof taken in conjunction with the accompanying drawings.

DESCRIPTION OF THE PREFERRED EMBODIMENT

Figure 1:
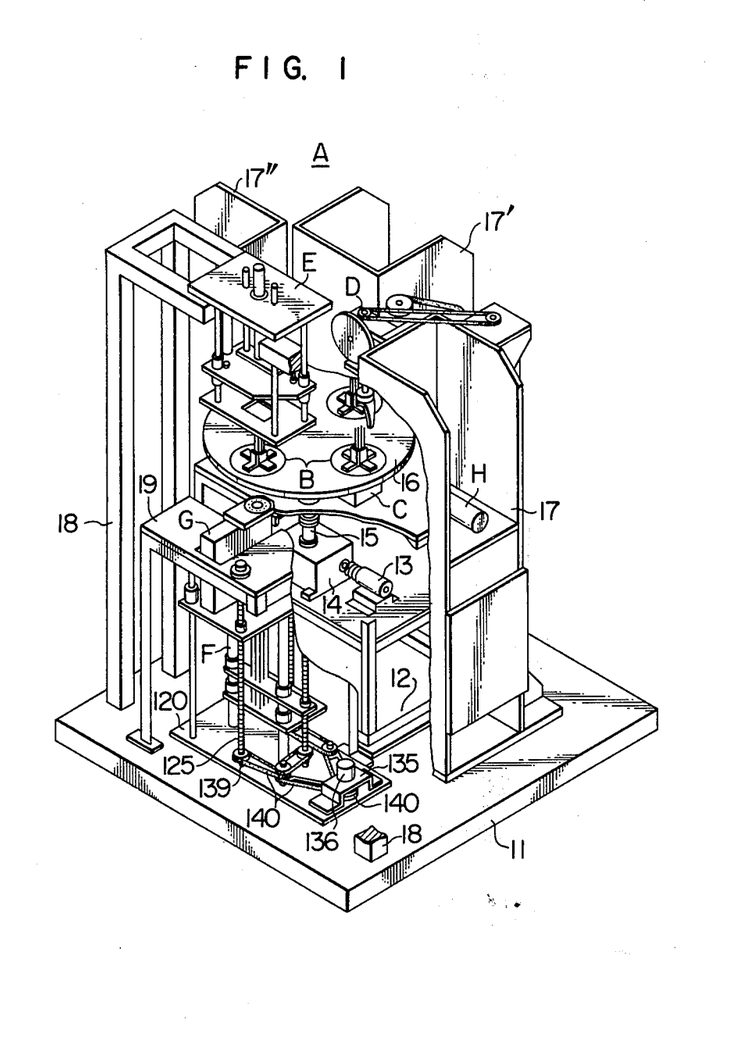
FIG. 1 is a perspective view, partly broken, of a preferred embodiment of a machine for winding and inserting coils in accordance with the present invention.

A machine for winding and inserting coils in accordance with the present invention comprises in general, as shown in FIG. 1, a transfer means comprising a stand 12, securely mounted on a base 11, a vertical shaft 15, drivingly coupled through a reduction gear 14 to a motor 13, mounted on the lower platform or deck of the stand 12 and extended upwards through the upper platform or deck of the stand 12, and a turntable 16 carried by the vertical shaft 15 at the upper end thereof for rotation in unison therewith. Four coil winding heads B are rotatably mounted on the turntable 16 and are equiangularly spaced apart from each other as will be described in more detail below. A drive or index means C is mounted on the upper deck of the stand 12 in opposed relationship with the coil winding head B for indexing and positioning the same. There winding means D, D' and D" (only one D being shown for the sake of simplicity because the construction is similar) are mounted on frames 17, 17' and 17", respectively, which, in turn, are mounted on the base 11, in opposed relationship with the coil winding heads B which are indexed so as to wind a conductor into a coil. A stator core holding means E is mounted on a frame or the like 18 in upwardly opposed relationship with the coil insertion position for holding a stator core so as to fit the same with the blades of the coil winding head B which carries all finished or wound coils and is brought to the coil insertion position. An insertion means F for inserting the coils into the stator core is held by the stator core holding means E. The insertion means F is mounted on a stand 19 (which in turn is securely mounted on the base 11) just below the insertion position. A wedge supply means G is arranged so as to supply the wedges to the insertion means F as will be described in more detail with particular reference to FIGS. 9 and 10 below. Conductor handling means H are provided for threading the end of the conductor drawn from the winding means D (D' and D") along a predetermined path and firmly holding it as will be described in detail hereinafter with particular reference to FIG. 11.

Figure 2:
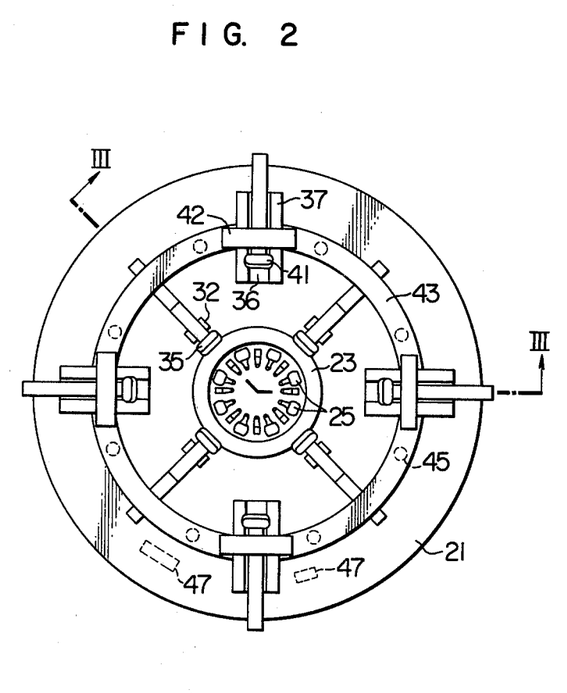
FIG. 2 is a top view of a coil winding head thereof.
Figure 3:
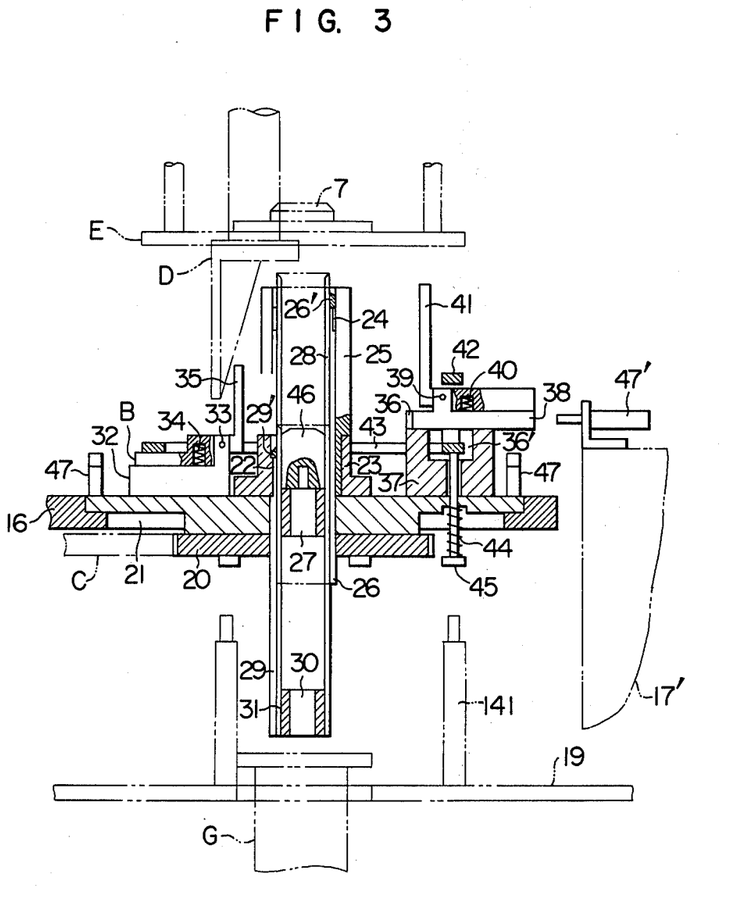
FIG. 3 is a sectional view taken along the line III—III of FIG. 2.
Figure 4:
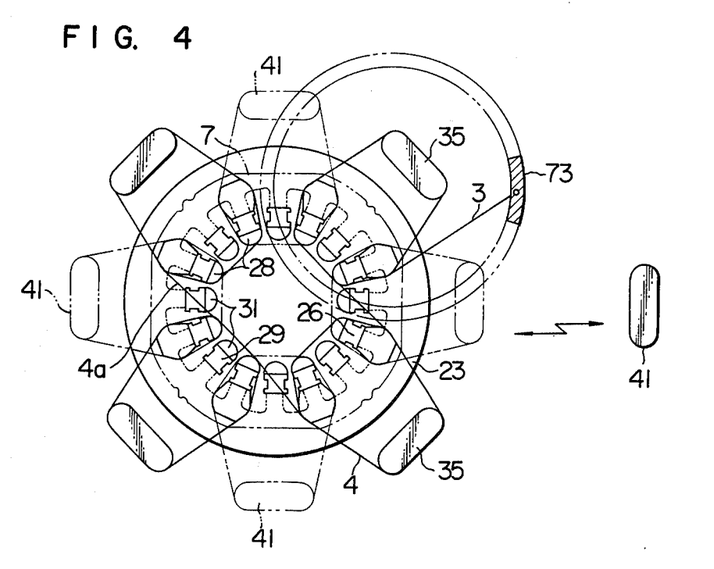
FIG. 4 is a view used for the explanation of the coil winding step.

Coil Winding Head B, FIGS. 2, 3 and 4

The coil winding head B includes a disk-shaped base or index plate 21 is mounted on the turntable 16 for rotation and has an index gear 20 securely attached to the undersurface thereof. A hollow cylindrical blade guide 23 is extended upwards coaxially of the base or index plate 21 has a plurality of axial guide grooves formed in the inside wall thereof, projections 22 being extended from the guide grooves. A plurality of supports 25 each having a projection 24 extended from the upper end thereof are arranged along the circumference of the hole of the blade guide 23 and equiangularly spaced apart from each other like a comb. A plurality of first wedge guides 26, each having a projection 26' extended from the upper end thereof for engagement with the projection 24 of the support 25, are slidably fitted into the guide grooves of the blade guide 23. A plurality of main blades 28 have their lower ends securely anchored to a cylindrical holder 27 having a plurality of equiangularly spaced apart axial grooves which are formed in the outer cylindrical surface of the holder 27 and adapted to cooperate with the guide grooves of the blade guide 23. A plurality of second wedge guides 29, each having a projection 29' extended from the upper end thereof for engagement with the projection 22, are slidably fitted into the guide grooves of the blade guide 23. A plurality of auxiliary blades 31, formed integral with the second wedge guides 29, have their lower ends securely anchored to cylindrical holder 30.

Four equiangularly spaced apart blocks 32 are mounted on the base or index plate 21 around the blade guide 23. An L-shaped auxiliary plate 35 is pivoted with pins 33 to the block 32 and biased under the force of a spring 34 in one direction. Four, equiangularly spaced apart guide blocks 37 are also securely mounted on the base or index plate 21 around the blade guide 23 and between the blocks 32. A sliding block 38, slidably fitted into a radial guide groove 36 formed in the upper surface of the guide block 37, is normally biased in the radially outward direction. A second auxiliary plate 41, also L-shaped, is pivoted with pins 39 to the block 38 and is biased to swing in one direction.

As best shown in FIG. 2, a ring-shaped holder 43 is extended over the horizontal branch or arm of each L-shaped first auxiliary plate 35 on the block 32 and through circumferential grooves 36' of the guide blocks 37. The holder 43 carries four arms 42 each of which is extended across and spaced apart upwardly by a suitable distance from the horizontal branch of the L-shaped second auxiliary plate 41 as best shown in FIG. 3. A plurality of pins 45 each with a head at the lower end thereof are extended downwards from the ring-shaped holder 43 through the index plate 21 and the guide blocks 37 and are equiangularly spaced apart from each other as best shown in FIG. 2. A spring 44 is loaded between the head of the pin 45 and the index base 11 so that the ring-shaped holder 43 may be normally biased towards the index base.

Mounted on the upper cylindrical holder 27 is a coil insertion block 46 which may slidably fit with both the main and auxiliary blades 28 and 31. Mounted on the index plate 21 are conductor clamping means 47 each consisting of a pair of leaf springs for holding the end of the coil. Mounted on the frame 17' is a cylinder 47' which is adapted to push the block 38 radially inwardly toward the blade guide 23 as will be described in more detail below.

Next the mode of operation of the coil winding head B with the above construction will be described. As best shown in FIG. 4, each bobbin is formed with two main blades 28 and one auxiliary plate 35 or 41 and a flier 73 (which will be described in detail hereinafter with particular reference to FIG. 6) winds the coil 4 around the bobbin. When the first auxiliary plate 35 is used, the second auxiliary plate 41 is held in the inoperative position which is indicated by the solid line and is out of the circular path of the flier 73.

When the second auxiliary plate 41 is to be used, the cylinder 47' is actuated to push the auxiliary plate 41 to the operative position indicated by the one-dot chain line in FIG. 4. In this case the auxiliary blades 31 are held in the lowered or inoperative position so that the passages for the flier 73 may be defined between the main blades 28.

When the coil 4 is to be inserted into the stator core, the auxiliary blades 31 are moved upwards to the same height as the main blades 28, thereby forming an insertion tooling.

Referring back to FIG. 3, when the pins 45 are pushed upwards by cylinders 141 (to be described in detail with particular reference to FIG. 8) so that the ring-shaped holder 43 and its arms 42 are moved away from the horizontal branches or arms of the first and second auxiliary plates 35 and 41, the latter are caused to swing towards the blade guide 23 under the forces of the springs 34 and 40 so that the removal of the coil 4 from the bobbin may be facilitated.

Figure 5:
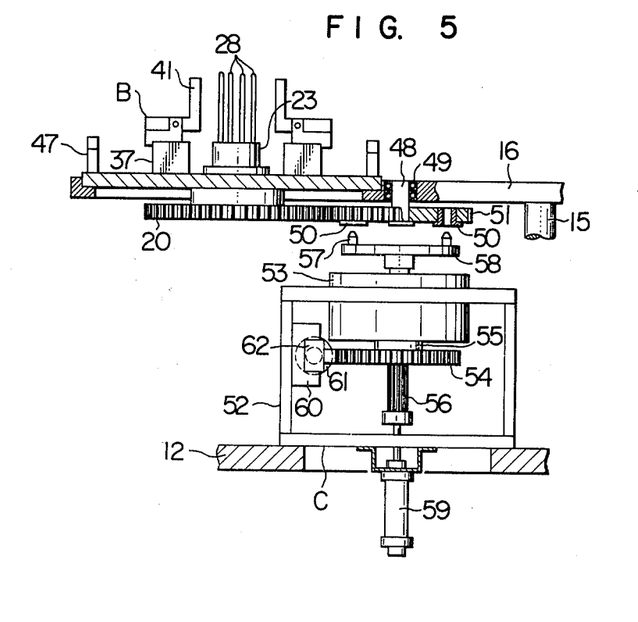
FIG. 5 is a front view, partly in section, of a drive or index means.

Drive or Index Means, FIG. 5

Referring to FIG. 5, the drive or index means C will be described in detail below. An index gear 51, rotatably mounted on the undersurface of the turntable 16 with a shaft 48 and bearings 49, is in mesh with the index gear 20 carried by the coil winding head B. The gear 51 has a plurality of equiangularly spaced apart bushings 50 extended through the gear 51 in parallel with the axis thereof.

A housing 53 is mounted on frames 52 which, in turn, are securely mounted on the upper deck of the stand 12. A shaft 55 which is internally splined and carries a pinion 54 at the lower end thereof is rotatably mounted on the housing 53. An externally splined shaft 56 which is extended through the internally splined shaft 55 has an index plate 58 carried at the upper end thereof coaxially of the index gear 51. A plurality of equiangularly spaced apart engaging or index pins 57 are extended upwards from the index plate 58 for engagement with the bushings 50 of the index gear 51. The lower end of the externally splined shaft 56 is joined to the piston rod of a cylinder 59 which is mounted on the frame 52 so that the engaging pins 57 may engaged with and disengage from the bushings 50 of the index gear 51.

The pinion 54, carried by the internally splined shaft 55, is in mesh with a rack 62 slidably carried by a guide rail 60 securely attached to the frame 52 and drivingly coupled to a cylinder 61.

The mode of operation of the drive or index means C is as follows. When the coil winding head B is brought to the coil winding position as the turntable 16 rotates, the cylinder 59 is actuated so as to lift the externally splined shaft 56, whereby the engaging or index pins 57 are inserted into the bushings 50 of the index gear 51. Next the cylinder 61 is actuated to slide the rack 62 so that the pinion 54, in mesh with the rack 62, is caused to rotate and consequently the externally splined shaft 56, splined to the internally splined shaft 55 is caused to rotate. As a result, the index gear 51, connected through the pin and bushing engagement with the externally splined shaft 56, is caused to rotate, turning the mating index gear 20 of the coil winding head B, whereby the latter is indexed.

When the piston rod of the cylinder 59 is extracted or withdrawn, the externally splined shaft 56 is lowered, whereby the pins 57 are disengaged from the bushings 50 of the index gear 51. Thereafter the cylinder 61 is actuated to withdraw the rack 62 towards its initial position. Then the index plate 58 is returned to its initial position.

Figure 6:
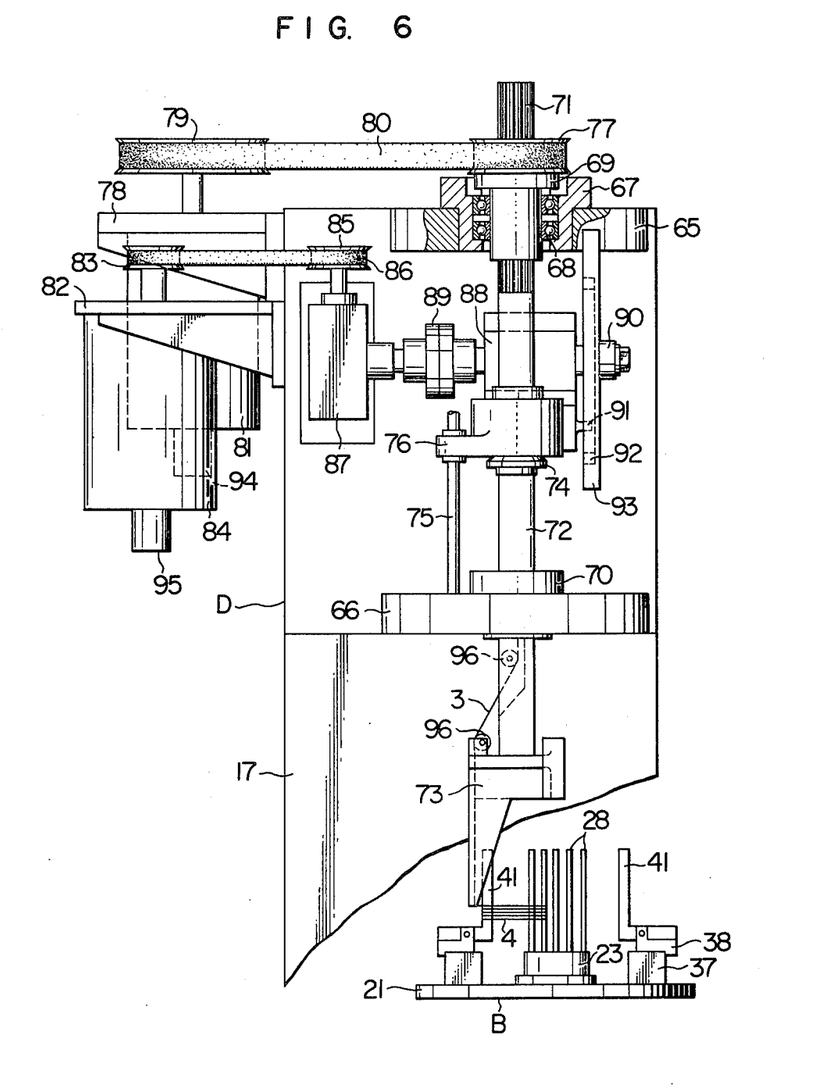
FIG. 6 is a front view, partly in section, of a winding means.

Winding Means D, FIG. 6

Next referring to FIG. 6, the winding means D will be described in more detail. Supports 65 and 66 are securely attached to the frame 17 and are spaced apart vertically by a suitably distance. An internally splined shaft 69 is rotatably supported by bearings 68 mounted on a housing or bearing block 67 which, in turn, is securely mounted on the upper support 65. A hollow shaft 72, which has an externally splined upper portion 71 for engagement with the internally splined shaft 69, is supported not only by a bearing 70 which, in turn, is mounted securely on the lower support deck 66 but also a bearing and carries the flier 73 at the lower end thereof. A cylindrical slider 76 which is slidably fitted over the hollow shaft 72 between the upper and lower support decks 65 and 66 is guide for vertical movement by an upright guide post 75 extended vertically from the lower support deck 66.

A motor 71 is mounted on the bracket 78 joined to the frame 17 and has a pulley 79 attached to the drive shaft thereof is drivingly coupled with an endless belt 80 to a pulley 77 splined to the externally splined upper portion 71 of the hollow shaft 72. Therefore, upon rotation of the motor 71, the hollow shaft 72 and hence the flier 73 are turned.

Another motor 84 is mounted on the frame 17 with a bracket 82 and has a pulley 83 attached to the drive shaft thereof and is drivingly coupled through an endless belt 86 to a pulley 85 carried by the input shaft of a reduction gear 87 mounted on the frame 17. The output shaft of the reduction gear 87 is drivingly coupled through a coupling 89 to one end of a cam shaft 90 rotatably supported by a bearing 88 which, in turn, is mounted on the frame 17. The other end of the cam shaft 90 carries a cam plate 93 with a cam groove 92 for engagement with a cam pin 91 extended from the slider 76.

In order to synchronize the drive of both the motors 81 and 84, the latter are equipped with sensors 94 and 95, respectively.

Both the hollow shaft 72 and the flier 73 are provided with guide rollers 96 for guiding the conductor 3 without causing any damage thereto.

Next the mode of operation of the winding means D will be described. When the coil winding head B is brought to the winding position and indexed in the manner described elsewhere and the main blades 28 and the first or second auxiliary plate 35 or 41 form a bobbin, both the motors 81 and 84 are driven in synchronism with each other so that the hollow winding shaft 72 is rotated while being moved upwards and downwards, whereby the edgewise wound coil 4 may be formed.

Figure 7:
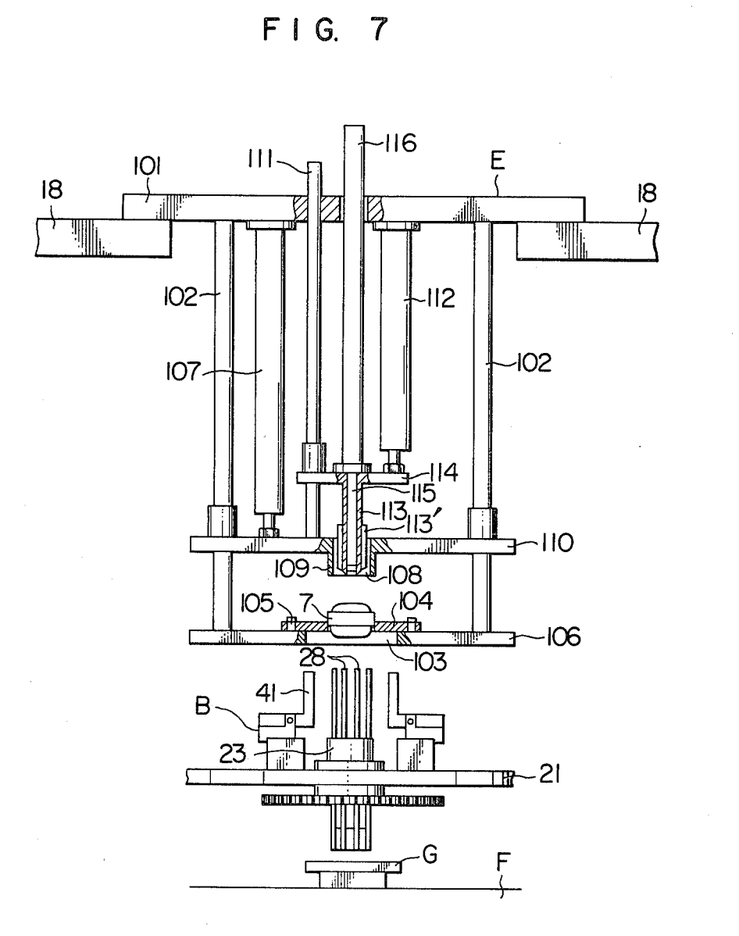
FIG. 7 is a front view, partly in section, of a holding means.

Stator Core Holding Means E, FIG. 7

Referring to FIG. 7, the stator core holding means E includes a base 101 supported by a horizontal yoke or arms extended from the upper ends of the posts or the like 18 (See FIG. 1). Four guide rods 102 which are depending from the base 101 have their lower ends securely joined to a supporting plate 106 with a center aperture 103 through which are inserted the coils 4 and positioning pins 105. A pallet 104 which receives the stator core 7 is mounted on the supporting plate 106 and positioned correctly with its positioning or reference holes fitted over the positioning pins 105 of the supporting plate 106.

A holding plate 110 is slidably fitted over the guide rods 102 and is connected to the piston rod of a cylinder 107 depending from the base 101 so that, as the cylinder 107 is actuated, the holding plate 110 is moved upwards away from the supporting plate 106 or downwards toward the plate 106 along the guide rods 102. A hollow cylindrical projection 109 with a through bore 108 is extended downwards from the holding plate 110 in the coaxial relationship with the stator core 7 received by the pallet 104 in such a way that the cylindrical projection 109 may securely hold down the stator core 7 when the coils 4 are inserted therein as will be described in more detail hereinafter.

A movable base or plate 114 is guided by a guide bar or rod 111 extended upright from the holding plate 110 and through the base 101 and is joined to the piston rod of a cylinder 112 depending from the base 101 so that the movable plate or base 114 may be moved vertically along the guide rod 111 as the cylinder 112 is extended or withdrawn. A tubular or elongated cylindrical projection 113, depending from the movable plate or base 114, is extended through the cylindrical projection 109 of the holding plate 110. A plurality of equiangularly spaced, axial fin-like projections 113' are extended radially outwardly from the lower portion of the cylindrical projection 113. A cylinder 116 is mounted on the movable plate or base 114 in such a way that its piston rod 115 may extend through the tubular or elongated cylindrical projection 113.

The mode of operation of the holding means E is as follows. When the coils 4 are inserted into the stator core 7 from the coil winding head B, the stator core 7 is supported or received by the pallet 104 which, in turn, is mounted on the supporting plate 106 with the positioning pins 105 inserted into the mating positioning holes of the pallet 104. Thereafter the cylinder 107 is actuated to lower the holding plate 110 to such a position where the lower end of the cylindrical projection 109 may be spaced apart from the stator core 7 by a predetermined distance. Next the cylinder 112 is actuated to lower the movable base 114 so that the projection 113 may extend through the stator core 7. In this case, the fin-like projections 113' of the projection 113 engage with the slots of the stator core 7 so that the latter may be accurately positioned in both the horizontal and circumferential directions. Under these conditions, a port of the cylinder 112 which has been communicated with a source (not shown) of pressurized air is opened to the surrounding atmosphere so that its piston rod may move freely. Next the coils 4 and the wedges are simultaneously inserted into the stator core 7 from the below by the insertion means F to be described in detail hereinafter. The projection 113 is pushed upwards by the insertion block 46 of the coil winding head B which, in turn, is pushed upwards by the insertion means F so that the projection 113 is moved away from the stator core 7. After the coils and wedges have been inserted into the stator core 7, the cylinder 116 is actuated to extend the rod 116 so as to push the insertion block 46 away from the stator core 7, whereby both the main and auxiliary blades 28 and 31 are forced to move away from the stator core 7. Thereafter the cylinders 107, 112 and 116 are actuated so as to return the supporting plate 106, the movable base 114 and the rod 115 to their initial positions, whereby the pallet 104 may be removed from the supporting plate 106.

Figure 8:
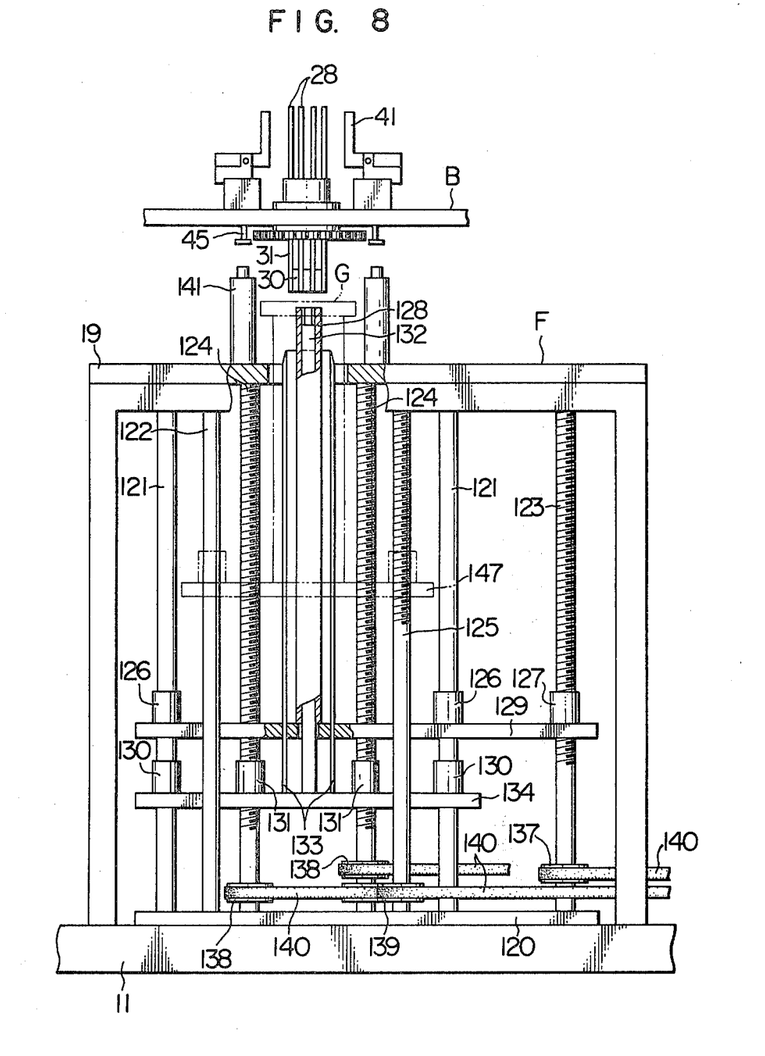
FIG. 8 is a front view, partly in section, of an insertion means.

Insertion Means F, FIGS. 1 and 8

Referring to FIGS. 1 and 8, extended between the top plate of the stand 19 and a sub-base 120 securely mounted on the base 11 are a plurality of guide rods or bars 121 and 122 and a plurality of lead screws 123, 124 and 125. A lift plate 129 has upright sleeves 126 slidably fitted over the guide rods 121 and a nut 127 engaged with the lead screw 123 so that as the lead screw 123 is rotated, the lift plate 129 is moved upwards along the guide rods or bars 121. A hollow shaft 128, whose base is securely joined to the upper surface of the lift plate 129, is extended through the wedge supply means G (to be described in detail hereinafter) with the upper end of the hollow shaft 128 in opposed and coaxial relationship with the lower cylindrical holder 30 of the coil winding head B.

An insertion plate 134 has sleeves 130 slidably fitted over the guide rods or bars 121 and nuts 131 in engagement with the lead screws 124 so that the insertion plate 134 may be vertically moved along the guide rods or bars 121 as the lead screws 124 are rotated. A shaft 132, whose lower end is securely anchored to the insertion plate 134, is extended through the hollow shaft 128. A plurality of equiangularly mutually spaced wedge insertion blades 133 are extended upwards from the insertion plate 134 and are spaced apart radially outwardly by a predetermined distance from the shaft 128. The wedge insertion blades 133 extend slidably through both the lift plate 129 and the wedge supply means G so as to insert into the slots of the stator core 7 the wedges formed by the wedge supply means G as will be described in more detail hereinafter.

Referring particularly to FIG. 1, a reversible motor 136 is mounted on a bracket 135 which, in turn, is mounted on the sub-base 120 and is drivingly coupled to electromagnetic clutches 137, 138 and 139 carried at the lower ends of the lead screws 123, 124 and 125, respectively, through the belt drives including endless belts 140.

A plurality of cylinders 141 are mounted on the deck of the stand 19 in opposed relationship with the pins 45 of the coil winding head B (See also FIG. 3).

The mode of operation is as follows. In order to insert the coils 4 into the stator core 7, the motor 136 is rotated in one direction while electromagnetic clutches 137, 138 and 139 are engaged or energized so that the lead screws 123, 124 and 125 are rotated, whereby both the lift plate 129 and the insertion plate 134 are lifted, the wedge supply means G being also lifted as will be described in detail hereinafter. The wedge supply means G pushes the lower cylindrical holder 30 of the coil winding head B, thereby causing the auxiliary blades 31 to lift to the same height as the main blades 28 so as to form the insertion tooling as described elsewhere. Simultaneously the cylinders 141 are actuated to push the pins 45 upwards so that the ring-shaped holder 43 may be lifted away from the first and second auxiliary plates 35 and 41. As a result, they are caused to incline toward the insertion tooling 28 and 31 as described elsewhere under the forces of the bias springs 34 and 40, whereby the removal of the coils from the bobbins may be facilitated. Thereafter the electromagnetic clutches 137 and 139 are de-energized or disengaged so that only the insertion plate 134 may be permitted to move further upwards and push the wedges away from the wedge supply means G so as to insert them into the wedge guides 26 and 29 between the main and auxiliary blades 28 and 31 (See also FIG. 4). Next the electromagnetic clutch 137 is energized or engaged again so that the lift plate 129 is lifted again in unison with the insertion plate 134 and the upper ends of the main and auxiliary blades 28 and 31 are extended through the stator core 7. When the wedge guides 26 and 29 engage with the lower end of the stator core 7, the electromagnetic clutch 137 is de-energized or disengaged again. As a result, only the insertion plate 134 is further lifted so that the hollow shaft 132 and the wedge guide blades 133 are moved upwards. The hollow shaft 132 pushes the insertion block 46 upwardly which, in turn, pushes upwards the coils 4 along the main and auxiliary blades 28 and 31 into the slots of the stator core 7. Simultaneously, the blades 133 push the wedges along the blade guides 26 and 29 into the slots of the stator core 7.

After the coils and wedges have been inserted into the stator core 7 in the manner described above, the motor 136 is reversed so that the lead screws 123, 124 and 125 are rotated in the opposite direction and consequently the insertion plate 134 along with the hollow shaft 132 and wedge guide blades 133 is lowered. Next the electromagnetic clutch 137 is actuated so as to cause the lift plate 129 to move downwards along with the shaft 128. Concurrently the cylinder 116 (See FIG. 7) of the holding means E is actuated to extend its rod 115, thereby pushing the insertion block 46 downwards. As a result, the insertion tooling or the main and auxiliary blades 28 and 31 are moved away from the stator core 7. Next the electromagnetic clutch 139 is actuated so as to lower the wedge supply means G. When the lift plate 129, the insertion plate 134 and the wedge supply means G are returned to their initial positions, respectively, the electromagnetic clutches 137, 138 and 139 are de-energized or disengaged and then the motor 136 is stopped.

Figure 9:
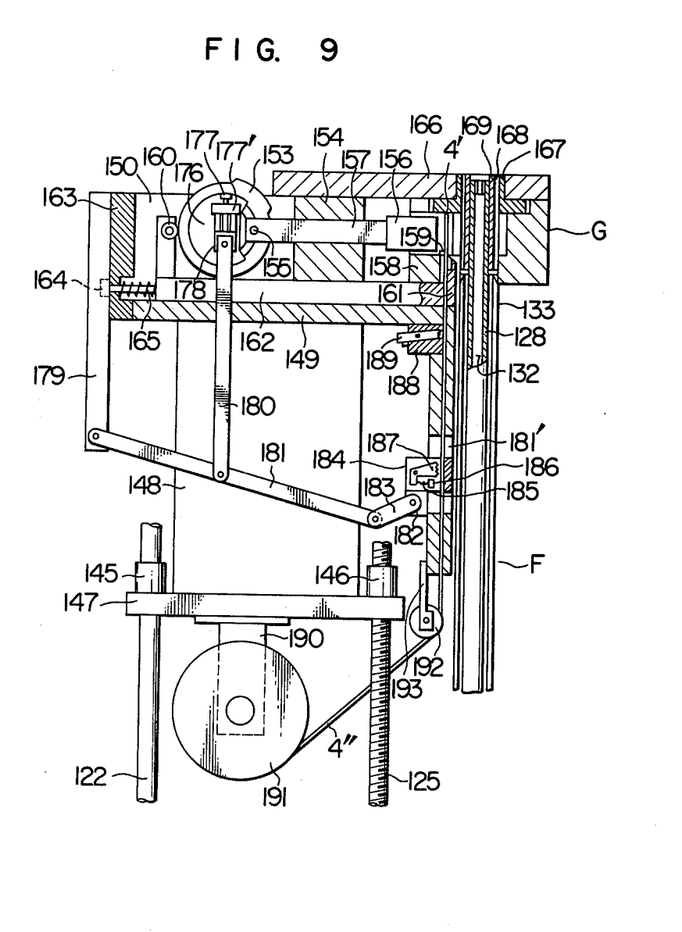
FIG. 9 is a side view, partly in section, of a wedge supply means.
Figure 10:
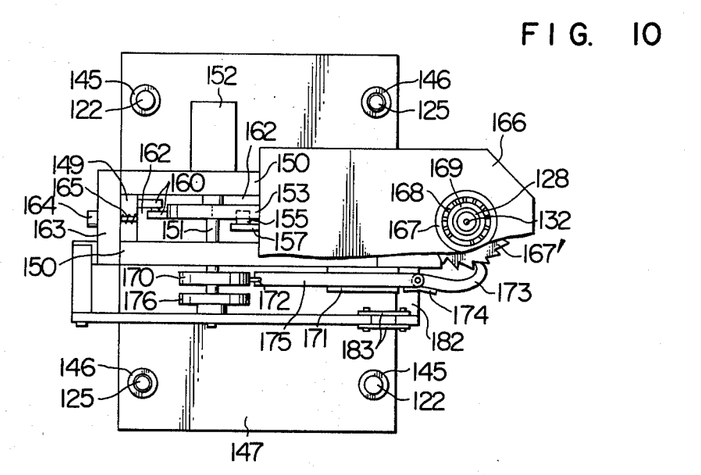
FIG. 10 is a top view, partly broken, thereof.

Wedge Supply Means G, FIGS. 9 and 10

Referring to FIGS. 9 and 10, the wedge supply means G includes a movable base 147 with the sleeves 145 slidably fitted over the guide rods or bars 122 and the nuts 146 engaged with the lead screws 125 so that the movable base 147 may be raised or lowered as described briefly in conjunction with the insertion means F. A pair of columns or the like 148 are erected upright on the movable base 147 and are spaced apart from each other by a suitable distance in the horizontal direction and an L-shaped base 149 is mounted on the columns or the like 148. Side plates 150 are mounted on the base 149 and spaced apart from each other by a suitable distance (See FIG. 10).

A motor 152 which is mounted on one of the side plates 150 has its drive shaft 151 extended through both the side plates 150 as best shown in FIG. 10. The drive shaft 151 carries not only a cam plate 153 which is positioned between the side plates 150 but also another cam plate 17 and a disk 176, both of which are located beyond the other side plate 150 as best shown in FIG. 10.

A hoop supply reel 191 is rotatably carried by a bracket 190 depending from the movable base 147 as best shown in FIG. 9 and a hoop guide roller 192 is rotatably carried by a bracket 193 depending from the lower end of the vertical portion of the L-shaped base 149 in order to guide the hoop 4", unwound from the supply reel 191, into a vertical guide passage extended through the vertical portion of the L-shaped base 149.

A vertically elongated guide groove 181' is formed through the vertical portion of the L-shaped base 149 in parallel with the passage of the hoop 4" as best shown in FIG. 9, and a hoop feed block 184 with an arm 182 is slidably fitted into the guide groove 181'.

The upper end of a link or crank 180 is pivoted with a pin to a block 178 mounted on a base 177' which, in turn, is securely attached to the disk 176. An adjusting screw 177 is provided between the block 178 and the base 177' so that the eccentricity of the block 178 may be adjusted as is well known in the art. The other end of the link or crank 180 is pivoted with a pin to a link or a coupler 181 at a point substantially intermediate of its ends and one end of the link or coupler 181 is pivoted with a pin to the lower end of a supporting bar or the like 179 depending from a side plate 163 attached to the side plates 150 while the other end of the coupler 181 is pivoted with a pin to one end of a link or lever 183 with the other end pivoted with a pin to the hoop feed block 184. Therefore, as the disk 176 is rotated, the hoop feed block 184 is vertically reciprocated in the guide groove 181' as is well known to those skilled in the art.

A pawl 187 is pivoted to the block 184 and is biased under the force of a spring 185, and a stopper 186 is attached to the block 184 in order to limit the angle of rotation of the pawl 187. When the block 184 is raised, the pawl 187 engages with the hoop 4", thereby lifting the same, but when the block 184 is lowered, the pawl 187 is released from the hoop 4". Another pawl 189 is pivoted to a block 188 attached to the L-shaped base 149 adjacent to the bend thereof and is extended into the passage of the hoop 4" in such a way that the pawl 189 may permit the lift of the hoop 4" but may prevent the free fall thereof by engaging therewith.

A holder 158 upon which is mounted a stationary blade 159 is securely interposed between the side plates 150 and a wedge magazine 169 with a plurality of equiangularly spaced axial grooves 168 for receiving the wedges 4' therein is rotatably mounted on the holder 158. A ratchet wheel 167 is mounted on the magazine 169 coaxially thereof.

A reciprocating rod 175, guided by a guide 171 attached to the side plate 150, carries at one end a cam follower or roller 172 which contacts the cam disk 170. The rod 175 has a pawl or catch 173 pivoted at the other end thereof for engagement with the teeth 167' of the ratchet wheel 167 as best shown in FIG. 10. As the rod 175 is displaced to the left in FIG. 10, the catch 173, biased under the force of a leaf spring 174 against the ratchet wheel 167, engages with the tooth 167' and pulls the same, thus causing the ratchet wheel 167 and hence the magazine 169 through an angle corresponding to the pitch of the grooves 168 thereof.

An L-shaped slider 162 is slidably mounted on the L-shaped base 149 and carries a roller 160 rotatably attached to the upper end of the upright portion which contacts the cam plate 153 under the force of a bias spring 165 loaded between the slider 162 and the end plate 163 on a bolt 164 which is slidably extended through the side plate 163. The slider 162 further carries a movable blade 161 attached to the other end remote from one end from which is extended the bolt 164, the movable blade 161 coacting with the stationary blade 159 so as to cut a wedge 4' off from the hoop 4". Another reciprocating rod 157 which is slidably guided by a guide block 154, securely interposed between the side plates 150, has a pusher 156 attached to one end thereof for pushing the wedge 4' into the groove 168 of the magazine 169 and a cam follower or roller 155 rotatably carried at the other end thereof and made into contact with the cam disk 153.

A top plate or cover 166 is mounted on the side plates 150 and the holder 158 and supports the upper end of the shaft of the ratchet wheel 167.

The mode of operation of the wedge supply means G is as follows. Before the wedge guide blades 133 of the insertion means G are raised in the manner described elsewhere, the motor 152 is rotated so that the disk 176 is rotated so as to swing the link or coupler 181. As a result, the hoop feed block 184 is caused to move upwards, lifting the hoop 4" by a predetermined length in the manner described elsewhere. Thereafter the slider 162 is reciprocated by the rotation of the cam disk 153 so that the stationary and movable blades 159 and 161 coact to cut off the wedge 4' from the hoop 4". Next the rod 157 is reciprocated so that its pusher 156 pushes the wedge 4' into the groove 168 of the magazine 169. Thereafter the rod 175 is reciprocated as the cam plate 170 rotates so that the catch 173 is reciprocated and consequently the ratchet wheel 167 and hence the magazine 169 are caused to rotate through a predetermined angle as described above. These steps are repeated until the wedges 4' are loaded into all the grooves 168 of the magazine 169.

Figure 11:
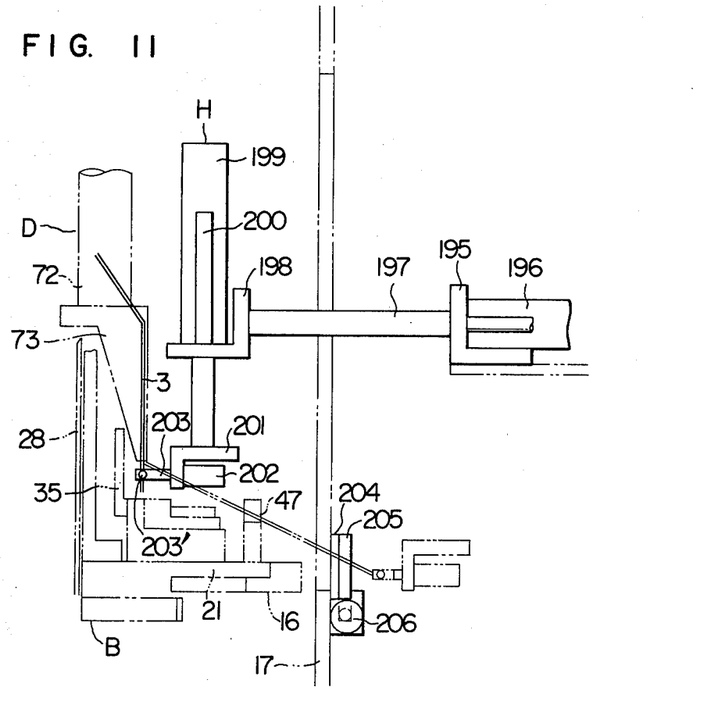
FIG. 11 is a side view of a handling means.

Conductor Handling Means H, FIG. 11

Next referring to FIG. 11, the construction of the conductor handling means H will be described in detail. The handling means are mounted on respective brackets 17, 17' and 17", but they are substantially similar in both construction and mode of operation so that it will suffice to describe only one handling means H mounted on the frame 17. A cylinder 196 which is mounted on the frame 17 with a bracket 195 has its piston rod attached to an L-shaped first movable base 198. One end of a guide rod 197, extended through the bracket 195 in parallel with the piston rod, is securely attached also to the L-shaped first movable base 198. A cylinder 199 is vertically mounted on the first movable base 198 and has its piston rod securely attached to an L-shaped second movable base 201. One end of a guide rod 200, extended through the first movable base 198 in parallel with the piston rod of the cylinder 199, is securely joined to the second base 201. A pair of clamping members or pawls 203, rotatably mounted on the second movable base 201, are adapted to be opened and closed by a cylinder 202 also mounted on the second movable base 201. A roller 203' with an annular or circumferential conductor guide groove is rotatably carried by one of the clamping members or pawls 203 on the outer side thereof. A stationary blade 204 is securely mounted on the bracket 17 with a shaft or pin which rotatably carries a movable blade 205. A cylinder 206, mounted on the frame 17, is operatively connected to the movable blade 205 so that the stationary and movable blades 204 and 205 coact to cut off the conductor 3.

The mode of operation of the handling means H is as follows. When the flier 73 starts winding, the cylinders 196 and 199 are actuated so as to cause the clamping members or pawls 203 to align with the conductor 3 extending from the lower end of the flier 73. Thereafter the cylinder 202 is actuated so as to cause the clamping members or pawls 203 to clamp the conductor 3 therebetween. Next the cylinders 196 and 199 are so actuated that the starting end of the conductor 3 may be inserted into the retainer or holder 47 of the coil winding head B.

After the coil 4 has been formed, the conductor 3, extended between the lower end of the flier 73 and the coil 4, is wrapped partly around the guide roller 203'. Thereafter the conductor 3 is further drawn from the flier 73 and inserted into the retainer or holder 47 and then between the stationary and movable blades 204 and 205. The cylinder 206 is then actuated so as to cut off the conductor 3.

General Mode of Operation

When the motor 13 is rotated, the turntable 16 is turned so that the coil winding head B is brought to the coil winding position immediately below the winding means D. Next the cylinder 59 of the drive or index means C is actuated, whereby the pins 57 are inserted into the bushings 50 and the cylinder 61 is actuated, whereby the coil winding head B is indexed in the manner described elsewhere (See FIG. 5). Thereafter the cylinders 59 and 61 are disabled, but the cylinders 196 and 199 of the handling means H (See FIG. 11) are activated so that the clamping members or pawls 203 are aligned with the conductor 3 drawn from the lower end of the flier 73 and then clamp it, thereby drawing it further and inserting it into the retainer 47 so as to form the starting end of the coil. Next the motors 81 and 84 of the winding means D (See FIG. 6) are driven in synchronism with each other so as to cause the flier 73 to wind the coil 4 around a predetermined bobbin which is formed by the main blades 28 and the first auxiliary plate 35. While the flier 73 is turning, it is gradually vertically reciprocated so as to provide a edgewise wound coil 4. When a first few turns are wound, the cylinder 202 (See FIG. 11) is actuated to cause the clamping members or pawls 203 to open, thereby releasing the conductor 3. When the coil 4 for the first pole is formed, both the motors 81 and 84 are stopped. In this case, the flier 73 is returned to its initial position after having made a few vertical strokes.

Next the cylinder 59 of the drive or index means C (See FIG. 5) is actuated again, thereby rotating the coil winding head B through 90° and both the cylinders 59 and 61 are returned to their initial states. Then the motors 81 and 84 of the winding means D are driven again so that the coil 4 for the second pole is formed around a bobbin formed by the main blades 28 and the auxiliary plate 35. In this case, the motor 81 is driven in the direction opposite to the direction for winding the first coil 4. The crossover lead 4a between the first and second poles is extended the shortest distance between both poles. In like manner, four coils 4 for one phase are continuously formed. After the four coils 4 have been formed, the cylinders 196 and 199 of the handling means H (See FIG. 11) are actuated in such a way that the roller 203' carried by one of the clamping members or pawls 203 may be aligned with the conductor 3 extending between the flier 73 and the coil and then receive the conductor 3. The conductor 3 is drawn from the flier 73 and inserted into the retainer 47, whereby the finishing end or lead may be provided. Thereafter the conductor 3 is cut off by the stationary and movable blades 204 and 205 by actuating the cylinder 206.

After the four coils 4 for the first phase are completed in the manner described above, the motor 13 (See FIG. 1) is driven again so as to rotate the turntable 16 through 90°, thereby bringing the coil winding head B to the next winding position immediately below the winding means D'. The coils for the second phase are formed in a manner substantially similar to that described above. However it should be noted that the cylinder 47' on the frame 17' (See FIG. 3) is actuated so as to shift the auxiliary plate 41 toward the blade guide 23 or the main blades 28, whereby a bobbin may be formed by the main blades 28 and the auxiliary plate 41.

The coil winding head B carrying all the coils to be inserted into the stator core 7 is brought to the insertion position between the holding means E and the insertion means F (See FIG. 1). The pallet 104 with the stator core 7 is mounted on the holding means E (See FIG. 7) and the cylinders 107 and 112 thereof are actuated in such a way that the cylindrical projection 109 may be spaced apart from the stator core 7 by a predetermined distance while the tubular projection 113 may be inserted into the stator core 7, whereby the latter may be accurately positioned. Next the motor 136 of the insertion means (See FIGS. 1 and 8) is driven in one direction and then the electromagnetic clutches 137, 138 and 139 are energized or engaged. Then the lift plate 129 and the insertion plate 134 and the movable base 147 of the wedge supply means G (See FIGS. 9 and 10) are lifted so that the upper plate 166 of the wedge supply means G pushes upwards the lower holder 30 of the coil winding head B until the lower holder 30 engages with the upper holder 27 (See FIG. 3). As a result, the auxiliary blades 31 are lifted to the same height as the main blades 28, whereby the insertion tooling is formed as described in detail elsewhere. Then the electromagnetic clutches 137 and 139 are de-energized or disengaged so that only the insertion plate 134 is further raised. Concurrently the cylinders 141 (See FIG. 8) are actuated to push upwards the pins 45 of the coil winding head B, thereby pushing upwards the ring-shaped holder 43. Then both the first and second auxiliary plates 35 and 41 are swung under the forces of the bias springs 34 and 40 in the manner described elsewhere so that the removal of the coils 4 from the bobbins may be facilitated. As the insertion plate 134 is further lifted, the wedge guide blades 133 are inserted into the axial grooves 168 of the magazine of the wedge supply means G (See FIG. 9), thereby pushing the wedges 4' in the axial grooves 168 into the wedge guides 26 and 29 (See FIG. 4). Thereafter the electromagnetic clutch 137 is energized or engaged again so that the lift plate 129 is lifted in unison with the insertion plate 134. As a consequence, the shaft 128 (See FIG. 8) pushes upwards the lower holder 30, whereby the insertion tooling (the main and auxiliary blades) is inserted into the stator core 7. When the upper end of the insertion tooling is extended slightly above the upper surface of the stator core 7, the electromagnetic clutch 137 is de-energized or disengaged so that the further lift of the lift plate 129 is stopped. The insertion plate 134 continues to rise so that the shaft 132 (See FIG. 8 again) pushes upwards the insertion block 46 (See FIG. 3) which, in turn, pushes the coils 4 held between the main and auxiliary blades 28 and 31 upwardly into the slots of the stator core 7. The blades 133 push the wedges upwardly through the wedge guides 26 and 29 into the slots of the stator core 7. In this case, the leads of the coils 4 are released from the retainers or holders 47. The upward movement of the stator core 7 due to the forces applied thereto when the coils 4 are inserted may be prevented by the cylindrical projection 109 (See FIG. 7). As the insertion block 46 is pushed into the stator core 7, the tubular projection 113 of the holding means E (See FIG. 7 again) is withdrawn from the core 7.

After the coils 4 and the wedges 4' have been completely inserted into the slots of the stator core 7 in the manner described above, the motor 135 of the insertion means (See FIG. 1) is reversed in direction so that the insertion plate 134 is lowered along with the shaft 132 and the wedge guide blades 133 (See FIG. 8). Next the electromagnetic clutch 137 is energized or engaged again so that the lift plate 129 is lowered along with the shaft 128. Concurrently the cylinder 116 of the holding means E (See FIG. 7) is actuated to extend the rod 116, thereby pushing the insertion block 46 downwards away from the stator core 7. Then the insertion block 46 pushes both the upper and lower holders 27 and 30 downwards so that both the main and auxiliary blades 28 and 31 are pulled out of the stator core 7. Next the electromagnetic clutch 139 is energized or engaged to lower the wedge supply means G. When all the wedge supply means G, the lift plate 129 and the insertion plate 134 are lowered to their initial positions, the electromagnetic clutches 137, 138 and 139 are de-energized or disengaged and then the motor 135 is stopped.

The main and auxiliary blades 28 and 31 are lowered until the projections 26' and 29' engage with the projections 24 and 22, respectively, so that the coil winding head B is ready for the next coil winding (See FIG. 3).

The cylinders 107, 112 and 116 of the holding means E (See FIG. 7) are actuated so that the holding plate 110, the movable base 114 and the rod 115 are all lifted. Thereafter the pallet 104 with the stator core 7 with the inserted coils 4 and wedges 4' is removed and a new pallet 104 with an empty stator core 7 is placed on the supporting plate 106. Meanwhile the motor 152 of the wedge supply means G (See FIGS. 9 and 10) is driven in order to insert new wedges 4' into the axial grooves 168 of the magazine 169.

In summary, according to the present invention, the coils 4 for one phase may be continously formed without cutting off the coils 4 for each pole. In addition, all the coils 4 and wedges 4' may be inserted into the slots of the stator core 7 by one insertion step.

What is claimed is:

1. A machine for winding and inserting coils of the type wherein a flier is rotated so as to wind the conductor drawn from the flier around two blades of an insertion tooling and an auxiliary plate located radially outwardly of said two blades and spaced apart therefrom by a predetermined distance, thereby forming a coil which is directly inserted into a magnetic core of a rotary electric machine, said machine CHARACTERIZED by the provision of a plurality of coil winding heads each having an insertion tooling with wedge guides, the blades of said insertion tooling being divided into alternating main and auxiliary blades which are spaced apart from each other at a predetermined distance, said auxiliary blades being so arranged as to be movable relative to said main blades, said auxiliary blades being retracted from said main blades when a coil is wound around a bobbin formed by two main blades and one auxiliary plate, said auxiliary blades being to align with said main blades when the coils are inserted into said magnetic core; and a drive or index means provided for each of said coil winding heads for intermittently rotating said coil winding head through a predetermined angle for indexing.

2. A machine for winding and inserting coils of the type wherein a flier is rotated so as to wind the conductor drawn from the flier around two blades of an insertion tooling and an auxiliary plate located radially outwardly of said two blades and spaced apart therefrom by a predetermined distance, thereby forming a coil which is directly inserted into a magnetic core of a rotary electric machine, said machine CHARACTERIZED by the provision of a plurality of coil winding heads each having an insertion tooling with wedge guides, the blades of said insertion tooling being divided into alternating main and auxiliary blades which are spaced apart from each other at a predetermined distance, said auxiliary blades being so arranged as to be movable relative to said main blades, said auxiliary blades being retracted from said main blades when a coil is wound around a bobbin formed by two main blades and one auxiliary plate, said auxiliary blades being raised such that the upper ends of all the blades are made of uniform height, when the coils are inserted into said magnetic core;
- a drive or index means provided for each of said coil winding heads for intermittently rotating said coil winding head through a predetermined angle for indexing, said drive means being selectively engageable with and disengageable from said coil winding head;
- a holding means for positioning and holding said magnetic core at the insertion position in opposed relationship with the coil winding head brought to said insertion position;
- a wedge supply means having a wedge magazine disposed in opposed relationship with said holding means with said coil winding head brought to said insertion position being interposed therebetween, said wedge magazine having a plurality of equiangularly spaced axial grooves formed in the outer cylindrical surface thereof for receiving therein wedges; and
- an insertion means disposed at said insertion position and provided with a shaft means extendable through said wedge magazine and said coil winding head brought to said insertion position for inserting the coils into the slots of said magnetic core and with a plurality of wedge guide blades extendable through said axial grooves of said wedge magazine, thereby inserting the wedges into the slots of said magnetic core.

3. A machine for winding and inserting coils of the type wherein a flier is rotated so as to wind the conductor drawn from the flier around two blades of an insertion tooling and an auxiliary plate located radially outwardly of said two blades and spaced apart therefrom by a predetermined distance, thereby forming a coil which is directly inserted into a magnetic core of a rotary electric machine, said machine characterized by the provision of a transfer means including an index turntable;
- a plurality of coil winding heads rotatably mounted on said index turntable and equiangularly spaced apart from each other, each of said coil winding heads including a base rotatably mounted on said index turntable, a plurality of main blades each having a wedge guide extended from said base and equiangularly spaced apart from each other, and a plurality of auxiliary blades each having a wedge guide extended from said base, disposed alternately of said main blades along the same circle of said main blades and equiangularly spaced apart from each other, said auxiliary blades being movable relative to said main blades axially thereof in such a way that when a coil is wound, said auxiliary blades may be retracted so that the coil may be wound around a bobbin formed by two main blades and one auxiliary plate, but when the coils are to be inserted into the slots of said magnetic core, said auxiliary blades are raised such that the upper ends of all the blades are made of uniform height, thereby forming an insertion tooling;
- a plurality of winding means the number of which is at least one less than the number of said coil winding heads, said winding means being disposed in opposed relationship with and upwardly of said coil winding heads rotated by said turntable, respectively, except one, each of said winding means having a flier carried by a winding shaft for winding the conductor around said bobbin, thereby forming a coil;
- a plurality of drive or index means equal in number to said coil winding heads and disposed in opposed relationship with and downwardly of said winding means, respectively, with said coil winding heads being interposed therebetween, said drive or index means being selectively engageable with and disengageable from the corresponding coil winding head so as to rotate the latter through a predetermined angle, thereby indexing the angular coil winding position thereof;
- a holding means disposed immediately above the insertion position to which is brought the coil winding head carrying all the coils ready to be inserted into the slots of said magnetic core, said holding means being adapted to securely hold said magnetic core in position;
- a wedge supply means disposed below said insertion position and including a wedge magazine which is vertically movable toward and away from said coil winding head brought to said insertion position and coaxially of said magnetic core held by said holding means, said wedge magazine having a plurality of equiangularly spaced apart, axial grooves formed in the outer cylindrical surface thereof for recieving therein wedges, respectively; and
- an insertion means disposed immediately below said insertion position, said insertion means including a shaft which is vertically extendable through said wedge magazine of said wedge supply means and said coil winding head brought to said insertion position, thereby inserting the coils carried on said coil winding head into the slots of said magnetic core held by said holding means, said insertion means further including a plurality of equiangularly spaced apart wedge blades which are vertically extendable into said axial grooves, respectively, of said wedge magazine, thereby pushing the wedges into the slots of said magnetic core held by said holding means.

4. A machine for winding and inserting coils as set forth in claim 1, 2 or 3 wherein the wedge guides and the associated blades, which form said insertion tooling, are coupled together for slidingly moving relative to each other with elastic means interposed therebetween, respectively, whereby even after said wedge guides engage with said magnetic core held by said holding means, said blades may be further inserted into said magnetic core.

* * * * *